US 9,743,023 B2

(12) United States Patent
Bol et al.

(10) Patent No.: US 9,743,023 B2
(45) Date of Patent: Aug. 22, 2017

(54) IMAGE SENSOR WITH SWITCHABLE BIASING ARRANGEMENT

(71) Applicant: UNIVERSITE CATHOLIQUE DE LOUVAIN, Louvaine-la-Neuve (BE)

(72) Inventors: David Bol, Bousval (BE); Numa Couniot, Nismes (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 0 days.

(21) Appl. No.: 15/113,314

(22) PCT Filed: Jan. 26, 2015

(86) PCT No.: PCT/EP2015/051527
§ 371 (c)(1),
(2) Date: Jul. 21, 2016

(87) PCT Pub. No.: WO2015/110646
PCT Pub. Date: Jul. 30, 2015

(65) Prior Publication Data
US 2017/0013216 A1    Jan. 12, 2017

(30) Foreign Application Priority Data

Jan. 24, 2014 (EP) .................................. 14152504
Jan. 27, 2014 (EP) .................................. 14152750

(51) Int. Cl.
*H04N 5/369* (2011.01)
*H04N 5/357* (2011.01)
(Continued)

(52) U.S. Cl.
CPC ........... *H04N 5/3698* (2013.01); *H04N 5/357* (2013.01); *H04N 5/365* (2013.01); *H04N 5/3745* (2013.01)

(58) Field of Classification Search
CPC .... H04N 5/3698; H04N 5/3745; H04N 5/357; H04N 5/365; H04N 5/374; H04N 5/378; H04N 5/355; H04N 5/3559; H04N 5/3653
(Continued)

(56) References Cited

U.S. PATENT DOCUMENTS 5,917,547 A  *  6/1999  Merrill ................. H04N 5/3745
                                                      348/241
8,189,082 B2 *  5/2012  Matsuura ............... H04N 5/355
                                                      327/210
(Continued)

FOREIGN PATENT DOCUMENTS

EP    1536475 A1    6/2005
EP    2192764 A1    6/2010

OTHER PUBLICATIONS

International Search Report and Written Opinion dated Apr. 15, 2015, for International Patent Application No. PCT/EP2015/051528.
(Continued)

*Primary Examiner* — Pritham Prabhakher
(74) *Attorney, Agent, or Firm* — Karceski IP Law, PLLC (57) ABSTRACT

In an image sensor, a photo detector circuit applies a photo current to a capacitive node during a photo detection time interval. A front-end circuit comprises an input transistor having a control node that is coupled to the capacitive node. A switchable biasing arrangement puts the input transistor in a disabled state during the photo detection time interval. The input transistor is put in an enabled state after the photo detection time interval. This then causes the front-end circuit to provide an output signal that is representative of a voltage on the capacitive node after the photo detection time interval.

11 Claims, 7 Drawing Sheets

(51) Int. Cl.
*H04N 5/365* (2011.01)
*H04N 5/3745* (2011.01)

(58) Field of Classification Search
USPC .......................................................... 348/308
See application file for complete search history.

(56) References Cited

U.S. PATENT DOCUMENTS

| | | | |
|---|---|---|---|
| 8,796,608 B2* | 8/2014 | Lee ...................... | H04N 5/3745 250/208.1 |
| 2001/0043085 A1 | 11/2001 | Shimazaki et al. | |
| 2006/0033007 A1* | 2/2006 | Terzioglu ............... | H04N 5/235 250/208.1 |
| 2008/0055432 A1* | 3/2008 | Koseki ................. | H04N 5/3658 348/241 |
| 2010/0053389 A1* | 3/2010 | Matsuura ............... | H04N 5/355 348/294 |
| 2010/0182470 A1* | 7/2010 | Sugawa ................. | H04N 3/155 348/294 |
| 2010/0276574 A1* | 11/2010 | Manabe ................. | H04N 5/353 250/214 A |
| 2014/0139713 A1* | 5/2014 | Gomi ................ | H01L 27/14618 348/308 |

OTHER PUBLICATIONS

Hanson et al., "A 0.5 V Sub-Microwatt CMOS Image Sensor with Pulse-Width Modulation Read-Out," IEEE Journal of Solid-State Circuits, vol. 45, No. 4, Apr. 2010.

* cited by examiner

IMAGE SENSOR WITH SWITCHABLE BIASING ARRANGEMENT

CROSS-REFERENCE TO RELATED APPLICATION(S)

This is a National Stage Entry into the United States Patent and Trademark Office from International PCT Patent Application No. PCT/EP2015/051527, having an international filing date of Jan. 26, 2015, which claims priority to European Patent Application No. 14152504.8, filed Jan. 24, 2014, and to European Patent Application No. 14152750.7, filed Jan. 27, 2014, the entire contents of all of which are incorporated herein by reference.

FIELD OF THE INVENTION

An aspect of the invention relates to an image sensor. The image sensor may be comprised in, for example, an integrated circuit, in particular in a low-voltage CMOS integrated circuit. The image sensor may form part of a device that should have low power consumption because, for example, the device is battery operated or must harvest energy from its environment. Such a device may be, for example, a wireless sensor device that can transmit acquired image data to a base device. Another aspect of the invention relates to an image acquisition device.

BACKGROUND OF THE INVENTION

An image sensor typically comprises a two-dimensional array of photo detector circuits. A photo detector circuit may operate as follows. The photo detector circuit comprises a photosensitive device, such as, for example, a photodiode that provides a photo current in response to incident light. The photo current charges or discharges a capacitive node during a given time interval. At the end of this time interval, a photo detection voltage is present on the capacitive node, which represents the incident light. A front-end circuit receives the photo detection voltage and, in response, provides an output signal that is representative of this voltage. The output signal may then be processed so as to obtain, for example, a pixel value.

The article entitled "A 0.5 V Sub-Microwatt CMOS Image Sensor with Pulse-Width Modulation Read-Out" by Scott Hanson et al., published in the IEEE Journal of Solid-State Circuits, Vol. 45, No. 4, April 2010, describes an image sensor with pulse-width modulation read-out. In this image sensor, a pixel structure comprises a two-transistor comparator. This comparator constitutes a front-end circuit, which is coupled to a photo detector circuit as described hereinbefore.

SUMMARY OF THE INVENTION

There is a need for a solution that allows an image sensor to provide satisfactory image quality, in particular at relatively low operating voltages.

In order to better address this need, the following points have been taken into consideration.

In an image sensor as described hereinbefore, the front-end circuit typically comprises an input transistor having a control node that is coupled to the capacitive node. In practice, the control node will draw a current from the capacitive node, which affects the photo detection voltage. The input transistor may be, for example, a CMOS transistor having a gate that is coupled to the capacitive node. A gate leakage current will then affect the photo detection voltage to a certain extent. The gate leakage current may be relatively large in case the image sensor has been manufactured using a modern CMOS technology, with nanometer resolution, allowing low voltage operation. On the other hand, the photo current may be relatively small, in particular if the photosensitive device is a photo diode manufactured in this CMOS technology. Such a photo diode generally has poor efficiency.

The gate leakage current may thus be significant with respect to the photo current that the photosensitive device provides. The image sensor may then be insensitive; an image of satisfactory quality cannot be acquired under normal light conditions. Moreover, the gate leakage current may exacerbate other image artifacts, such as, for example, fixed pattern noise, dark signal non uniformity and photo response non uniformity.

In accordance with an aspect of the invention, there is provided an image sensor as claimed in claim 1, which is appended to the description. Another aspect of the invention concerns an image acquisition device comprising such an image sensor.

In such an image sensor, the input transistor is put in a disabled state during the photo detection time interval, and then put in an enabled state after the photo detection time interval. In the disabled state, the input transistor is biased so that, when the photo detection time interval starts, each main node of the input transistor is at a voltage that approximates a reset voltage that is forced upon the capacitive node before the photo detection time interval starts. Accordingly, the input transistor is prevented from drawing a relatively large current from the photo detection node during the photo detection time interval. The photo detection voltage will substantially be determined by the photo current and thus by the incident light. This contributes to reducing image artifacts, thus allowing a satisfactory image quality.

An embodiment of the invention may comprise one or more additional features as defined in dependent claims, which are appended to the description.

For the purpose of illustration, a detailed description of some embodiments of the invention is presented with reference to accompanying drawings.

DETAILED DESCRIPTION

Figure 1:
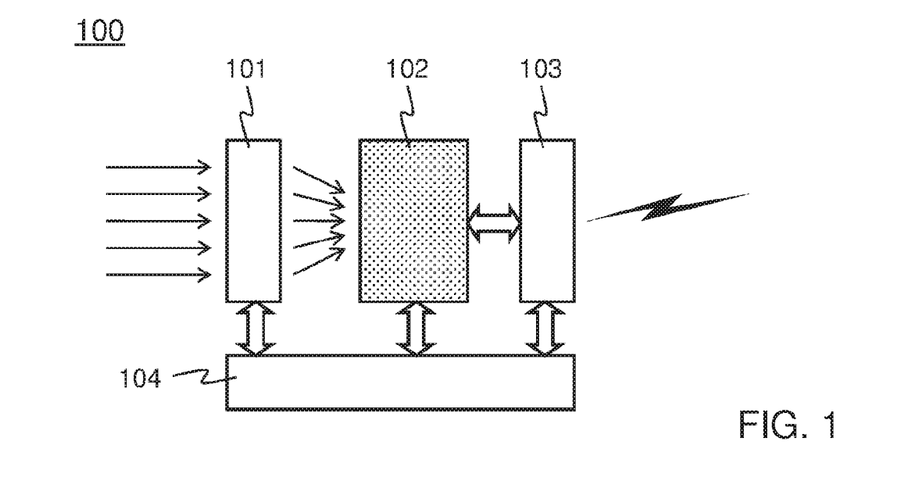
FIG. 1 illustrates an image acquisition device, which is schematically represented in a block diagram.

FIG. 1 illustrates an image acquisition device 100, which is schematically represented in a block diagram. The image acquisition device 100 comprises a lens arrangement 101 and an image sensor 102. The image acquisition device 100 may further comprise a communication interface 103 and a device controller 104. The image sensor 102, the communication interface 103, and the device controller 104 may be comprised in, for example, a single integrated circuit. This integrated circuit then constitutes a so-called "System-on-Chip", whereby the image sensor 102 may constitute a so-called semi-conductor IP block, IP being an acronym for "Intellectual Property".

The image acquisition device 100 may be battery operated, or may harvest energy from its environment, or both. For example, the image acquisition device 100 may constitute a wireless sensor node in a system that comprises various wireless sensor nodes, which may be similar. Such a system typically comprises a base device, which collects image data from one or more wireless sensor nodes. In such a system, the image acquisition device 100 illustrated in FIG. 1 may communicate with the base device through the communication interface 103, typically according to a wireless communication protocol.

Low power consumption is desired, in particular if the image acquisition device 100 is battery operated, or harvests energy from its environment. Low-power consumption can be achieved by forming the image sensor 102, as well as other circuits, in a CMOS integrated circuit using a modern, high resolution, manufacturing process; CMOS being an acronym for Complementary Metal-Oxide Semiconductor. This CMOS integrated circuit is then preferably operated at a low supply voltage, which may be less than 1 V, V representing Volt.

However, low power consumption typically comes at an expense of relatively poor image quality. The image sensor 102 may provide an image that suffers from various artifacts, such as, for example, fixed pattern noise, photo response non-uniformity, and temporal noise. The image will typically have a relatively small dynamic range, as well as a relatively small signal-to-noise ratio. The image sensor 102 that will be described hereinafter comprises solutions that allow better image quality at low power consumption.

Figure 2:
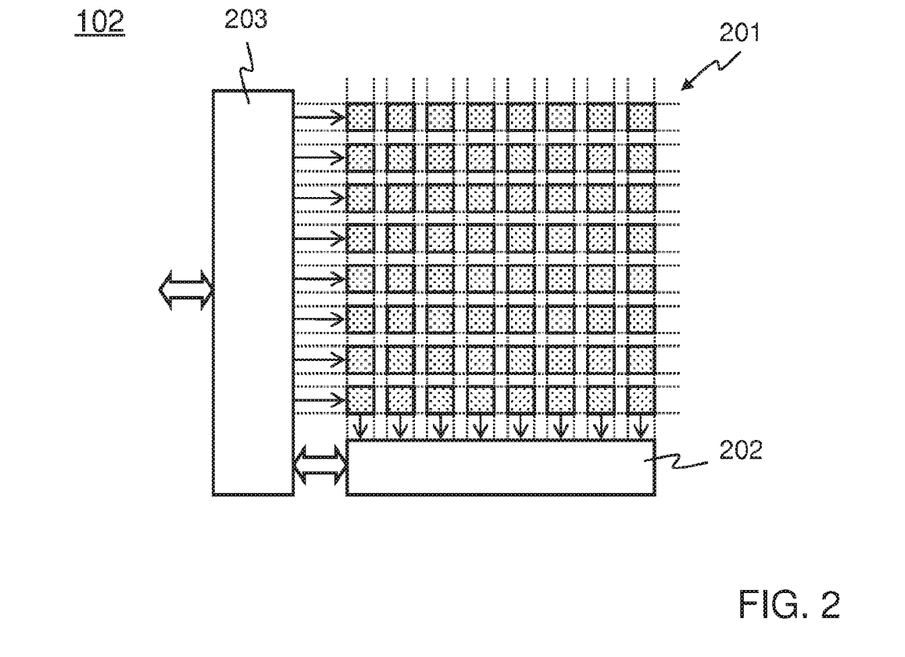
FIG. 2 illustrates an image sensor, which is schematically represented in a block diagram.

FIG. 2 illustrates the image sensor 102, which is schematically represented in a block diagram. The image sensor 102 comprises a matrix of pixel sensors 201, a conversion module 202, and a control and interface module 203. The pixel sensors are arranged in rows and columns. In FIG. 2, a pixel sensor is schematically represented by a square. A pixel sensor uniquely belongs to a particular row and a particular column.

The image sensor 102 may operate as follows. The control and interface module 203 sequentially selects one row of pixel sensors from the matrix of pixel sensors 201. A pixel sensor in a selected row provides an output signal that is representative of an amount of light to which the pixel sensor has been exposed. The selected row of pixel sensors thus provides an array of output signals in a column-parallel fashion. The conversion module 202 converts this array of output signals into an array of digital values. The control and interface module 203 can form an image by sequentially selecting respective rows of pixels in the matrix of pixel sensors 201. The image is in the form of a matrix of digital values. A digital value is associated with a pixel sensor and represents the amount of light to which the pixel sensor has been exposed.

Figure 3:
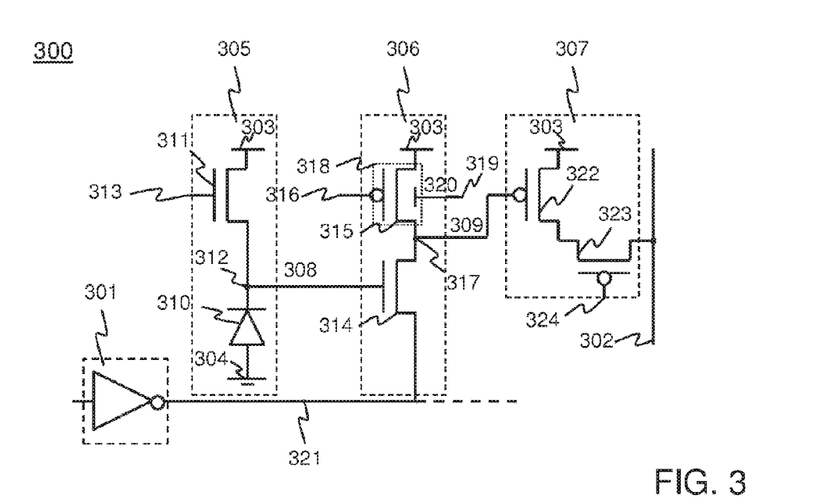
FIG. 3 illustrates a pixel sensor, which is schematically represented in a circuit diagram.

FIG. 3 illustrates a pixel sensor 300, which is schematically represented in a circuit diagram. The pixel sensor 300 belongs to a row and a column in the matrix of pixel sensors 201 illustrated in FIG. 2. Other pixel sensors of this matrix may be similar to the pixel sensor 300 illustrated in FIG. 3. That is, the pixel sensor 300 illustrated in FIG. 3 may represent any of the pixel sensors in the matrix 201.

FIG. 3 further illustrates a binary driver circuit 301, which constitutes a switchable biasing arrangement for the pixel sensor 300, as well as and as for other pixel sensors belonging to the same row. FIG. 3 further illustrates a readout line 302 that couples the pixel sensor 300 to the conversion module 202 illustrated in FIG. 2. This readout line 302 also couples other pixel sensors belonging to the same column to the conversion module 202.

The pixel sensor 300 receives a supply voltage through a pair of power supply lines 303, 304, one of which can be a positive power supply line 303 on which a positive supply voltage can be present. The other power supply line can be a signal ground line 304 on which signal ground can be present.

The pixel sensor 300 comprises various functional parts: a photo detector circuit 305, a front-end circuit 306, and an output switch circuit 307. For each of these circuits, FIG. 3 illustrates details that represent a particular embodiment. These embodiments will be discussed in greater detail hereinafter, as well as alternative embodiments. It is noted that the embodiments comprise transistors of the CMOS type, which typically comprise two main nodes, in the form of a source and a drain, and a control node, in the form of a gate. The source may also be considered as a reference node. The drain may be considered as an output node. For the sake of simplicity and convenience, it is assumed that each transistor of the embodiments described hereinafter comprises a gate, a source, and a drain.

The pixel sensor 300 basically operates as follows. The photo detector circuit 305 provides a photo detection voltage 308. The photo detection voltage 308 has a level that depends on an amount of light to which the photo detector circuit 305 has been exposed during a photo detection time interval. The front-end circuit 306 receives the photo detection voltage 308 and, in response, provides an output signal 309 that is representative of the photo detection voltage 308. The output switch circuit 307 can transfer this output signal 309 to the readout line 302.

In more detail, the photo detector circuit 305 comprises a photosensitive device 310 and a reset circuit 311. The photosensitive device 310 may be in the form of, for example, a photodiode, as illustrated in FIG. 3. The reset circuit 311 may be in the form of, for example, a reset transistor as illustrated in FIG. 3. The photosensitive device 310 and the reset circuit 311 will therefore hereinafter be referred to as photodiode 310 and reset transistor 311, respectively, for reasons of convenience. An interconnection node between the photodiode 310 and the reset transistor 311 constitutes a photo detection node 312. The photo detection node 312 has a capacitance with respect to signal ground and can therefore be said to be capacitive. The photo detection voltage 308 occurs at the photo detection node 312.

The gate of the reset transistor 311 is coupled to the control and interface module 203 via a reset line 313. This reset line 313 also couples other reset transistors of other pixel sensors belonging to the same row to the control and interface module 203. The drain of the reset transistor 311 is coupled to the positive power supply line 303. The source is coupled to the photo detection node 312.

The front-end circuit 306 comprises two transistors arranged in series between the pair of power supply lines 303, 304: an input transistor 314 and a complementary transistor 315. The gate of the input transistor 314 is coupled to the photo detection node 312 of the photo detector circuit 305. That is, the gate of the input transistor 314 is coupled to receive the photo detection voltage 308 on this node. The gate of the complementary transistor 315 is coupled to the control and interface module 203 through a reference line 316. This reference line 316 also couples other complementary transistors of other pixel sensors belonging to the same row to the control and interface module 203. The source of the complementary transistor 315 is coupled to the positive power supply line 303. The respective drains of the input transistor 314 and the complementary transistor 315 are coupled to each other and constitute an output node 317 of the front-end circuit 306. The output signal 309 representative of the photo detection voltage 308 occurs of this output node 317. This will be explained in greater detail hereinafter.

In the embodiment illustrated in FIG. 3, the complementary transistor 315 is formed in a well 318. More specifically, the input transistor 314 is of the N-type and the complementary transistor 315 is of the P-type. That is, the input transistor 314 is an NMOS transistor and the complementary transistor 315 is a PMOS transistor which is formed in an N-well 318. The well 318 has an N-type doping and lies in a P-doped substrate. The input transistor 314 may be directly formed in this substrate.

A particular feature of the front-end circuit 306 is that the well 318 of the complementary transistor 315 is coupled to an adaptive biasing circuit via a biasing line 319. The biasing circuit generates a well biasing voltage 320, which is applied to the well 318 of the complementary transistor 315 through the biasing line 319. This biasing line 319 may also couple the adaptive biasing circuit to respective wells of other complementary transistors of other pixel sensors in the pixel sensor 300, irrespective of whether such another pixel sensor 300 belongs to the same column for the same row, or not. The respective wells of the other complementary transistors of the other pixel sensors may thus also receive the well biasing voltage 320 from the adaptive biasing circuit. This biasing scheme, which involves the adaptive biasing circuit that will be described in greater detail hereinafter, allows a significant improvement in image quality.

A further particular feature of the front-end circuit 306 is that the source of the input transistor 314 is coupled to a gating line 321, rather than being coupled to the signal ground line 304. The gating line 321 couples the source of the input transistor 314 to the binary driver circuit 301 illustrated in FIG. 3. This gating line 321 also couples the binary driver circuit 301 to respective sources of other input transistors of other pixel sensors belonging to the same row. This gating scheme, which will be described in greater detail hereinafter, also allows a significant improvement in image quality.

The output switch circuit 307 comprises a buffer transistor 322 and a switch transistor 323, which may both be of the P-type. The gate of the buffer transistor 322 is coupled to the output node 317 of the front-end circuit 306. The source of this transistor is coupled to the positive power supply line 303, and its drain is coupled to the readout line 302 via the switch transistor 323. The gate of the switch transistor 323 is coupled to the control and interface module 203 illustrated in FIG. 2 via a readout-enabling line 324. This readout-enabling line 324 also extends to respective gates of other switch transistors of other pixel sensors that belong to the same row.

Figure 4:
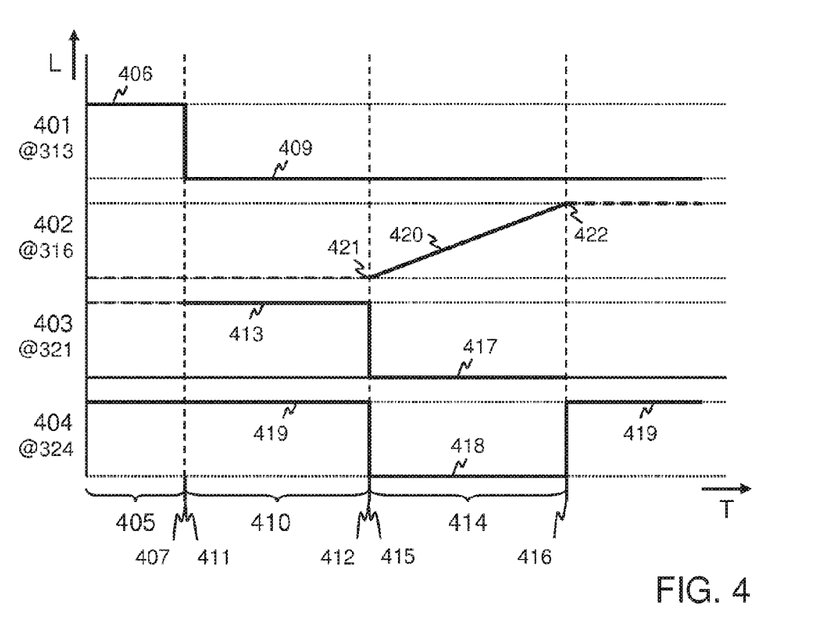
FIG. 4 illustrates various control signals for the pixel sensor, which are schematically represented in a time diagram.

FIG. 4 illustrates various control signals for the pixel sensor 300, which are schematically represented in a time diagram. The time diagram has a horizontal axis that represents time T, and a vertical axis that represents signal level L. The time diagram is divided into respective horizontal sections representing respective control signals. An uppermost section represents a reset signal 401, which occurs on the reset line 313 mentioned hereinbefore and illustrated in FIG. 3. An upper middle section represents a reference signal 402, which occurs on the reference line 316 mentioned hereinbefore and illustrated in FIG. 3. A lower middle section represents a gating signal 403, which occurs on the gating line 321 mentioned hereinbefore and illustrated in FIG. 3. A lowermost section represents a readout enabling signal 404, which occurs on the readout-enabling line 324 mentioned hereinbefore and illustrated in FIG. 3. Further details of operation of the pixel sensor 300 illustrated in FIG. 3 can be elucidated with reference to the control signals illustrated in FIG. 4.

In a reset time interval 405, the reset signal 401 has a high level 406. This puts the reset transistor 311 in a conducting state. As a result, the photo detection node 312 is coupled to the positive power supply line 303. A reset biasing voltage, which may be close in level to the positive supply voltage, is thus forced upon the photo detection node 312. The reset time interval 405 ends at an instant 407, which will be referred to as reset end 407 hereinafter. At the reset end 407, the level of the photo detection voltage 308 will thus correspond to the reset biasing voltage. At this instant, the reset signal 401 exhibits a transition from the high level 406 to a low level 409. This puts the reset transistor 311 in a non-conducting state; the reset biasing voltage is no longer enforced on the photo detection node 312.

The reset time interval 405 is followed by a photo detection time interval 410. The photo detection time interval 410 starts at an instant 411, which will be referred to as photo detection start 411 hereinafter. The photo detection start 411 may correspond with the reset end 407, as illustrated in FIG. 4. The photo detection time interval 410 ends at an instant 412, which will be referred to as photo detection end 412 hereinafter.

During the photo detection time interval 410, the photodiode 310 is exposed to a particular spatial portion of the projected light from the lens arrangement 101. In response to this projected light portion, the photodiode 310 provides a photo current that continuously discharges the photo detection node 312 throughout the photo detection time interval 410. The photo current has a magnitude that depends on an intensity level of the projected light portion to which the photodiode 310 is exposed. This light intensity thus determines a rate at which the photo detection node 312 is discharged.

At the photo detection end 412, the level of the photo detection voltage 308 thus reflects an amount of light to which the photodiode 310 has been exposed during the photo detection time interval 410. The amount of light is a product of the light intensity and the photo detection time interval 410 in terms of duration. The higher the intensity level is, the greater the amount of light to which the photodiode 310 is exposed, and the lower the level of the photo detection voltage 308 will be.

In practice, several leakage currents will discharge the photo detection node 312, in addition to the photo current. In dark conditions, the projected light portion to which the photodiode 310 is exposed may have a relatively low intensity level. The magnitude of the photo current may then be so small that the leakage currents dominate. The photo current is then effectively masked by leakage currents. The leakage currents thus determine a level of sensitivity of the pixel sensor 300. The smaller the leakage currents are, the more sensitive the pixel sensor 300 will be.

The photodiode 310 itself produces a leakage current. Namely, the photodiode 310 produces a current even when the photodiode 310 is not exposed to any light. This leakage current can therefore be referred to as dark current. The input transistor 314 also produces a leakage current: the gate of the input transistor 314 draws current from the photo detection node 312. In conventional pixel sensors, this gate leakage current is generally significantly smaller than the dark current of the photodiode 310. The photodiode 310, or rather its dark current, will substantially determine the level of sensitivity of such a pixel sensor 300.

However, in the pixel sensor 300 illustrated in FIG. 3, the gate leakage current of the input transistor 314 may be significant, dominating the dark current of the photodiode 310. The gate leakage current of the input transistor 314 can be relatively large because, for example, the pixel sensor 300 may be manufactured using a modern CMOS technology, with nanometer resolution, allowing low voltage operation. What can make matters worse, is that the photosensitive device will typically have a relatively poor efficiency if manufactured with such a technology. The photosensitive device will produce a relatively small photo current for a given intensity of incident light. It should be noted that the gate leakage current can be reduced by downsizing the input transistor 314. However, this leads to greater mismatch between pixel sensors, which generally exacerbates other artifacts, such as, for example, fixed pattern noise.

The relatively large gate leakage current of the input transistor 314 may thus potentially cause the pixel sensor 300 to have a relatively poor level of sensitivity. The gate leakage current may even make the pixel sensor 300 insensitive, that is, incapable of operating properly under weak light conditions. The gate leakage current may be so large that this current is still significant compared with the photo current under normal light conditions. Extending this to the image sensor 102 illustrated in FIG. 2, it may then not be possible to acquire an image of satisfactory quality under normal light conditions.

The relatively large gate leakage current of the input transistor 314 may even exacerbate other image artifacts, such as, for example, fixed pattern noise, dark signal non uniformity and photo response non uniformity. This is because gate leakage currents present a relatively large statistical distribution. A gate leakage current of a MOS transistor may deviate from a nominal value within a considerably wide range.

The following feature can alleviate at least one of the aforementioned image-capturing problems, which the gate leakage current of the input transistor 314 may cause. The gating signal 403 has a high level 413 during the photo detection time interval 410. This high level 413 may correspond with the reset biasing voltage, or a voltage close thereto. As illustrated in FIG. 3, and indicated hereinbefore, the gating signal 403 is present on the source of the input transistor 314. Consequently, the reset biasing voltage, or a voltage close thereto, is enforced on the source of the input transistor 314 during the photo detection time interval 410. The gate of the input transistor 314 receives the photo detection voltage 308, which corresponds with the reset biasing voltage at the photo detection start 411.

Thus, at least at the photo detection start 411, there is only a relatively small difference in voltage between the gate and the source of the input transistor 314. Both these nodes are at the reset biasing voltage, or a voltage close thereto. The difference in voltage may be considered to be relatively small if, for example, the difference is less than 25% or, more preferably, less than 10% of the supply voltage. Moreover, there is also such a relatively small difference in voltage between the gate and the drain of the input transistor 314, which is at a voltage close to the positive supply voltage like the reset biasing voltage. This significantly reduces the gate leakage current, at least at the photo detection start 411, which allows a satisfactory level of sensitivity and may counter other image artifacts. The pixel sensor 300 illustrated in FIG. 3 can thus provide a satisfactory image quality while being designed for low power and low cost. A significant improvement in image quality is achieved respect to a variant of the pixel sensor 300 illustrated in FIG. 3, in which the source of the input transistor 314 is simply coupled to the signal ground line 304.

It should be noted that the difference in voltage between the gate and the source of the input transistor 314 may gradually increase over time during the photo detection time interval 410. This is because, on the one hand, the source of the input transistor 314 continues to receive the reset biasing voltage, or a voltage close thereto, throughout the photo detection time interval 410. On the other hand, the gate of the input transistor 314 receives the photo detection voltage 308, which will gradually decrease in level starting from the reset biasing voltage during the photo detection time interval 410. This decrease is due to the photo current from the photodiode 310, which discharges the photo detection node 312, as explained hereinbefore. As a result, the gate leakage current, which is relatively small at the photo detection start 411, may nevertheless gradually increase during the photo detection time interval 410.

Such a gradual increase of the gate leakage current during the photo detection time interval 410 does not significantly affect image quality. Namely, this gradual increase occurs at a rate corresponding with the rate at which the photo detection node 312 is discharged by the photo current. As explained hereinbefore, the rate at which the photo detection node 312 is discharged depends on the level of intensity of the projected light portion to which the photodiode 310 is exposed. That is, it is under strong light conditions only that the gate leakage current may significantly increase. However, in these conditions, the photo current will dominate over the gate leakage current, which prevents the gate leakage current from significantly affecting image quality. Under weak light conditions, the gate leakage current will exhibit a relatively small increase only, which also prevents the gate leakage current from significantly affecting image quality.

Referring again to FIG. 4, the photo detection time interval 410 is followed by a readout time interval 414. The readout time interval 414 starts at an instant 415, which will be referred to as readout start 415 hereinafter. The readout start 415 may correspond with the photo detection end 412, as illustrated in FIG. 4. The readout time interval 414 ends at an instant 416, which will be referred to as readout end 416 hereinafter.

The gating signal 403 has a low level 417 during the readout time interval 414. The low level 417 may correspond with signal ground. Referring to FIG. 3, the source of the input transistor 314 can be regarded as being coupled to the signal ground line 304. That is, the source can be considered to be at signal ground.

The readout enabling signal 404, which occurs on the readout-enabling line 324 illustrated in FIG. 3, is at a low level 418 during the readout time interval 414. The readout enabling signal 404 may be at a high level 419 outside this time interval. The readout enabling signal 404 controls the switch transistor 323 illustrated in FIG. 3, which receives this signal at its gate. The readout enabling signal 404 causes the switch transistor 323 to form a conducting circuit during the readout time interval 414. The buffer transistor 322 can thus present on the readout line 302 an inverted version of the output signal 309 from the front-end circuit 306. This signal is representative of the photo detection voltage 308, as mentioned hereinbefore. The readout enabling signal 404 may cause the switch transistor 323 to form a non-conducting circuit outside readout time interval 414. In effect, the pixel sensor 300 is then decoupled from the readout line 302.

The reference signal 402, which occurs on the reference line 316 illustrated in FIG. 3, constitutes an input signal for the front-end circuit 306. FIG. 3 illustrates an example in which the front-end circuit 306 comprises a comparator. The input transistor 314 and the complementary transistor 315 form this comparator, which has a pair of comparator inputs. The gate of the input transistor 314 constitutes one comparator input, which receives the photo detection voltage 308. In effect, the photo detection voltage 308 imposes a gate-source voltage on the input transistor 314; a difference in voltage between the gate and the source. The gate of the complementary transistor 315 constitutes another comparator input, which receives the reference signal 402. In effect, the reference signal 402 imposes a gate-source voltage on the complementary transistor 315; a difference in voltage between the source and the gate.

The output signal 309 of the front-end circuit 306 is of a binary nature: the output signal 309 has two possible binary values: 0 and 1. The output signal 309 is 0 if the gate-source voltage of the input transistor 314 exceeds the gate-source voltage of the complementary transistor 315 by a comparator threshold level. Stated otherwise, the output signal 309 is 0 if there is a gate-source voltage level difference between the input transistor 314 and the complementary transistor 315 that is above the comparator threshold level. Conversely, the output signal 309 is 1 if there is a gate-source voltage level difference between the input transistor 314 and the complementary transistor 315 that is below the comparator threshold level.

In the front-end circuit 306 illustrated in FIG. 3, the comparator threshold level depends on various parameters, among which are respective transistor threshold voltages of the input transistor 314 and the complementary transistor 315. This will be explained in greater detail hereinafter. Sizing of the aforementioned transistors is another parameter that affects the comparator threshold level of the front-end circuit.

The reference signal 402, which complementary transistor 315 receives at its gate, exhibits a ramp 420 during the readout time interval 414. The ramp 420 corresponds with a voltage having a level that monotonously increases from a low level 421 and to a high level 422. The low level 421 may correspond with, for example, signal ground. The high level 422 may depend on, for example, a saturation level that the photo detection voltage 308 is expected to have under a strong light condition. The high level 422 may correspond with, for example, a level of obtained by subtracting the saturation level from the positive supply voltage. Alternatively, the high level 422 may simply correspond with, for example, the positive supply voltage.

At the readout start 415, the gate-source voltage of the complementary transistor 315 is relatively large. This is because, at this instant, the gate of the complementary transistor 315 is at the low level 421 of the reference signal 402, whereas the source is at the positive supply voltage. The gate-source voltage of the input transistor 314 will typically be smaller. For example, under normal light conditions, the photo detection voltage 308, which is present at the gate of the input transistor 314, may be approximately half way between the positive supply voltage and signal ground. The gate-source voltage level difference between the input transistor 314 and the complementary transistor 315 may thus be below the comparator threshold value. The output signal 309 of the front-end circuit 306 will then be 1. Since the output switch circuit behaves as an inverter, the binary value 0 will occur on the readout line 302 at the readout start 415.

The gate-source voltage level difference between the input transistor 314 and the complementary transistor 315 will then gradually increase over time. This is because the level of the reference signal 402 gradually increases over time according to the ramp 420 illustrated in FIG. 4. As a result, the gate-source voltage of the complementary transistor 315 will gradually decrease. The gate-source voltage of the input transistor 314 remains substantially constant at a level corresponding with the photo detection voltage 308. As long as the gate-source voltage level difference between the input transistor 314 and the complementary transistor 315 remains below the comparator threshold value, the output signal 309 of the front-end circuit 306 will remain 1.

At a given instant, the gate-source voltage level difference between the input transistor 314 and the complementary transistor 315 will correspond with the comparator threshold voltage. At that instant, the output signal 309 of the front-end circuit 306 exhibits a transition from 1 to 0 and an inverse transition, from 0 to 1, occurs on the readout line 302. This output transition instant depends on the level of the photo detection voltage 308, which in turn depends on the level of intensity of the projected light portion to which the photodiode 310 has been exposed. In this example, the more intense the projected light portion is, the lower the level of the photo detection voltage 308 is, and the longer it will take for the output transition instant to occur with respect to the readout start 415.

After the output transition instant, the gate-source voltage level difference between the input transistor 314 and the complementary transistor 315 will continue to gradually increase over time. Consequently, this gate-source voltage level difference will be above the comparator threshold level after the output transition instant. The output signal 309 of the front-end circuit 306 will be 0 and an inverse value 1 will occur on the readout line 302. This binary value may continue to occur on the readout line 302 until the readout end 416.

The pixel sensor 300 illustrated in FIG. 3 can thus present a binary pulse on the readout line 302 during the readout time interval 414. The binary pulse may be the inverted version of the output signal 309 from the front-end circuit 306, as described hereinbefore. The binary pulse may start at the readout start 415 illustrated in FIG. 4. The binary pulse may end at the output transition instant mentioned hereinbefore. A transition from 0 to 1 then occurs, which is an inversion of the transition from 1 to 0 mentioned hereinbefore. The binary pulse has thus a width that is a function of the level of intensity of the projected light portion to which the pixel sensor 300 has been exposed. It should be noted that the readout line 302 may be pre-discharged to 0 before the readout start 415 in order to avoid so-called race conditions. This pre-discharging can be carried out one clock cycle prior to the readout start 415.

Referring to FIG. 2, the conversion module 202 receives the binary pulse that the pixel sensor 300 presents on the readout line 302. The conversion module 202 may comprise a counter that starts a count at the readout start 415. The counter may end this count when the transition from 0 to 1 occurs, that is, at the output transition instant. For example, the binary value 1 on the readout line 302 may constitute a count inhibit signal for the counter.

The count that the conversion module 202 carries out can provide a digital value that represents light intensity picked up by the pixel sensor 300. More precisely, the digital value represents the level of intensity of the projected light portion to which the photodiode 310 of the pixel sensor 300 has been exposed during the photo detection time interval 410. The conversion module 202 may then transfer this digital value, which is a pixel value, to the control and interface module 203.

Figure 5:
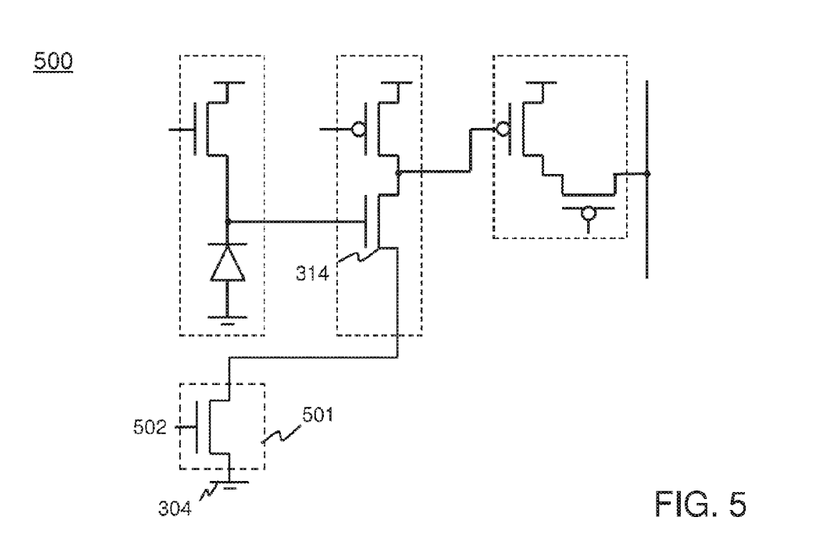
FIG. 5 illustrates a first variant of the pixel sensor, which is schematically represented in a circuit diagram.

FIG. 5 illustrates a first variant 500 of the pixel sensor 300 illustrated in FIG. 3. Like elements are denoted by like reference numerals. For the sake of simplicity and convenience, only those elements that are discussed are denoted by reference numerals. In this first variant, a biasing switch circuit 501 has replaced the binary driver circuit 301 as the switchable biasing arrangement. The biasing switch circuit 501 is coupled between the source of the input transistor 314 and the signal ground line 304. It should be noted that respective sources of respective input transistors of other pixel sensors that belong to the same row may also as be coupled to the signal ground line 304 via the biasing switch circuit 501 illustrated in FIG. 5.

The biasing switch circuit 501 is a non conducting state during the photo detection time interval 410. This implies that the source of the input transistor 314 is floating during this time interval. As a result, the source will be at a voltage that approximates the voltage at the gate of the input transistor 314, which receives the photo detection voltage 308. The input transistor 314 is then in a disabled state, which prevents this transistor from having a significant gate leakage current that discharges the photo detection node 312.

The biasing switch circuit 501 in a conducting state at least during readout time interval 414. The source of the input transistor 314 is coupled to the signal ground line 304 during this time interval. The input transistor 314 is then in an enabled state.

The first variant 500 of the pixel sensor thus operates in a fashion similar to that of the pixel sensor 300 illustrated in FIG. 3. The biasing switch circuit 501 may be put in the non-conducting state and the conducting state by means of a gating signal 502 similar to the gating signal 403 illustrated in FIG. 4, or the inverse thereof.

Figure 6:
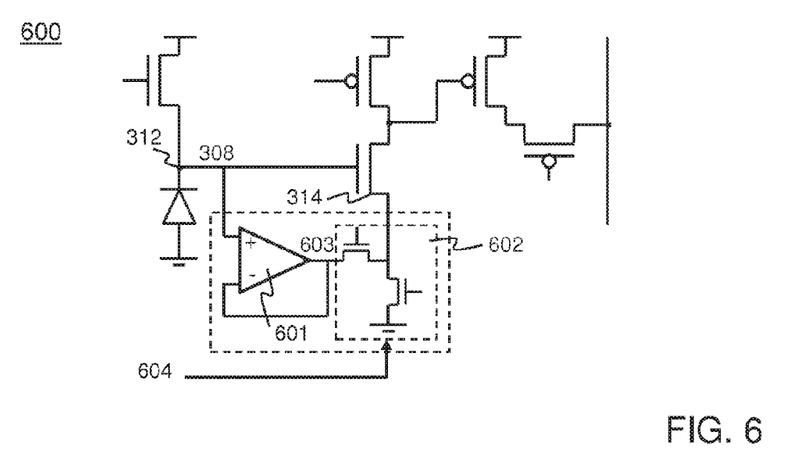
FIG. 6 illustrates a second variant of the pixel sensor, which is schematically represented in a circuit diagram.

FIG. 6 illustrates a second variant 600 of the pixel sensor 300 illustrated in FIG. 3. Like elements are denoted by like reference numerals. For the sake of simplicity and convenience, only those elements that are discussed are denoted by reference numerals. The second variant 600 comprises a voltage follower circuit 601 and a biasing switch circuit 602. These elements constitute a switchable biasing arrangement that replaces the binary driver circuit 301 illustrated in FIG. 3.

The voltage follower circuit 601 provides a buffered copy 603 of the photo detection voltage 308 on the photo detection node 312. The biasing switch circuit 602 applies the buffered copy 603 of the photo detection voltage 308 to the source of the input transistor 314 during the photo detection time interval 410. The gate-source voltage of the input transistor 314 will then be near to zero. The buffered copy 603 of the photo detection voltage 308 thus constitutes a disabling biasing voltage, which puts the input transistor 314 in a disabled state. This prevents the input transistor 314 from producing a relatively large gate leakage current that discharges the photo detection node 312.

The biasing switch circuit 602 couples the source of the transistor to the signal ground line 304 during the readout time interval 414. The input transistor 314 is then is an enabled state. The second variant 600 of the pixel sensor thus also operates in a fashion similar to that of the pixel sensor 300 illustrated in FIG. 3. The biasing switch circuit 602 may be controlled by means of a gating signal 604 similar to the gating signal 403 illustrated in FIG. 4, or the inverse thereof.

Figure 7:
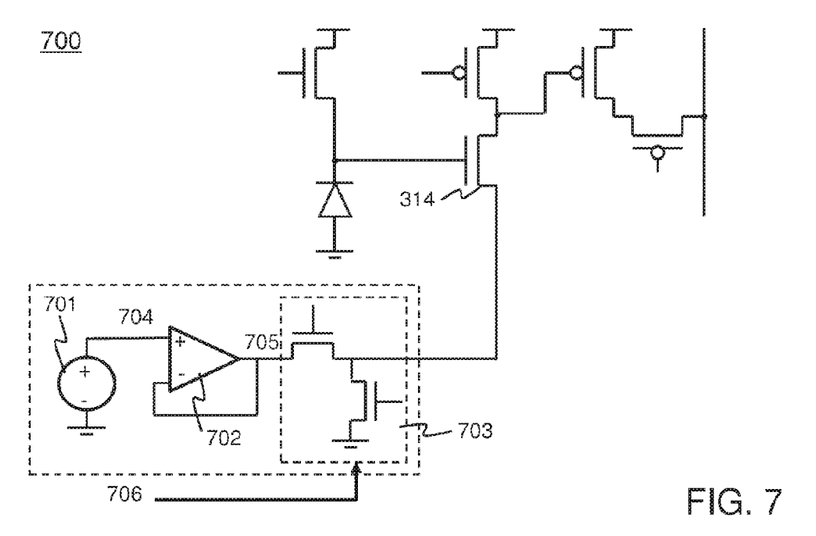
FIG. 7 illustrates a third variant of the pixel sensor, which is schematically represented in a circuit diagram.

FIG. 7 illustrates a third variant 700 of the pixel sensor 300 illustrated in FIG. 3. Like elements are denoted by like reference numerals. For the sake of simplicity and convenience, only those elements that are discussed are denoted by reference numerals. The third variant 700 comprises a voltage source 701, a voltage follower circuit 702, and a biasing switch circuit 703. These elements constitute a switchable biasing arrangement that replaces the binary driver circuit 301 illustrated in FIG. 3. Other pixel sensors belonging to the same row may also be coupled to this switchable biasing arrangement.

The voltage source 701 provides a disabling biasing voltage 704 that can disable the input transistor 314 when applied to the source of this transistor. This disabling biasing voltage 704 can have a fixed level that has been optimized for obtaining a minimum level of gate leakage current when this voltage is applied to the source. The disabling biasing voltage 704 will typically approximate the reset biasing voltage. The voltage follower circuit 702, which is optional, provides a buffered copy 705 of the disabling voltage 704. The biasing switch circuit 703 applies the buffered copy 705 of the disabling voltage to the source of the input transistor 314 during the photo detection time interval 410. This puts the input transistor 314 in a disabled state, thus preventing a relatively large gate leakage current from discharging the photo detection node 312 during this time interval.

The biasing switch circuit 703 couples the source of the transistor to the signal ground line 304 during the readout time interval 414. The input transistor 314 is then is an enabled state. The third variant 700 of the pixel sensor thus also operates in a fashion similar to that of the pixel sensor 300 illustrated in FIG. 3. The biasing switch circuit 703 may be controlled by means of a gating signal 706 similar to the gating signal 403 illustrated in FIG. 4, or the inverse thereof.

Figure 8:
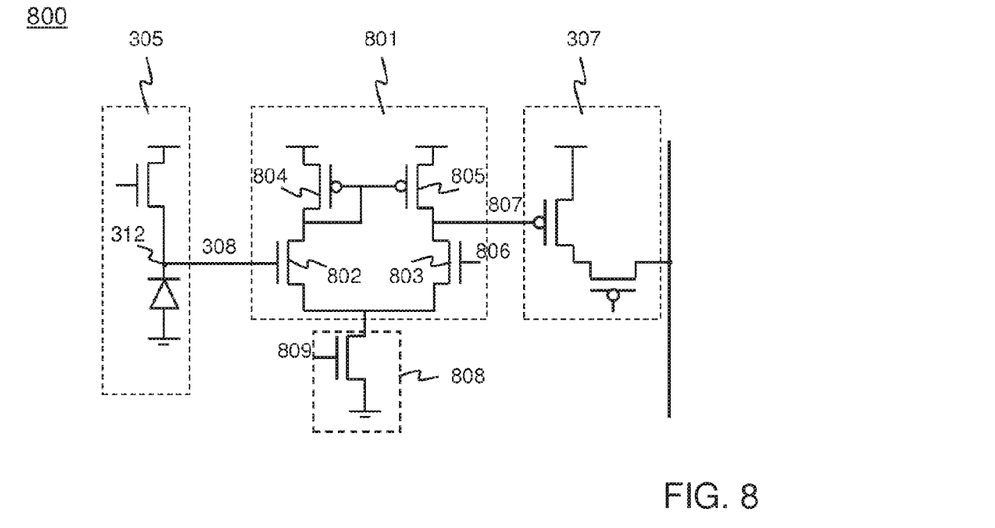
FIG. 8 illustrates an alternative pixel sensor, which is schematically represented in a circuit diagram.

FIG. 8 illustrates an alternative pixel sensor 800 that may be used in the image sensor 102 illustrated in FIG. 2. The alternative pixel sensor 800 has a basic architecture similar to that of the pixel sensor 300 illustrated in FIG. 3. The alternative pixel sensor 800 also comprises a photo detector circuit 305, a front-end circuit 801, and an output switch circuit 307. The photo detector circuit 305 and the output switch circuit 307 may be similar to those of the pixel sensor 300 illustrated in FIG. 3 and are therefore denoted by like reference numerals. For the sake of simplicity and convenience, only those elements that are discussed are denoted by reference numerals.

The front-end circuit 801 of the alternative pixel sensor 800 is different from that of the pixel sensor 300 illustrated in FIG. 3. The front-end circuit 801 in FIG. 8 comprises a differential transistor circuit that forms a comparator. The differential transistor circuit has an input transistor 802 and an opposite input transistor 803, which are arranged as a differential pair. The differential transistor circuit further comprises a current mirror formed by two transistors 804, 805 one of which 804 is arranged in a diode configuration. The gate of the input transistor 802 is coupled to receive the photo detection voltage 308, which is present on the photo detection node 312. The gate of the opposite input transistor 314 is coupled to receive a reference signal 806, which may be similar to the reference signal 402 illustrated in FIG. 4. The front-end circuit 801 illustrated in FIG. 8 may provide an output signal 807 that is similar to that of the front-end circuit 300 illustrated in FIG. 3. That is, the output signal 807 comprises a binary pulse that has a width, or rather duration, indicative of the amount of light to which the photo detector circuit 305 has been exposed.

The alternative pixel sensor 800 comprises a controllable current source 808 that is coupled to the differential transistor circuit. The controllable current source 808 is disabled during the photo detection time interval 410. This puts the input transistor 802 in a disabled state, thus preventing a relatively large gate leakage current from discharges the photo detection node 312 during this time interval. The controllable current source 808 is enabled at least during the readout time interval 414, causing the front-end circuit 802 to provide the output signal 807 described hereinbefore. The controllable current source 808 may be controlled by means of a gating signal 809 similar to the gating signal 403 illustrated in FIG. 4, or the inverse thereof.

Figure 9:
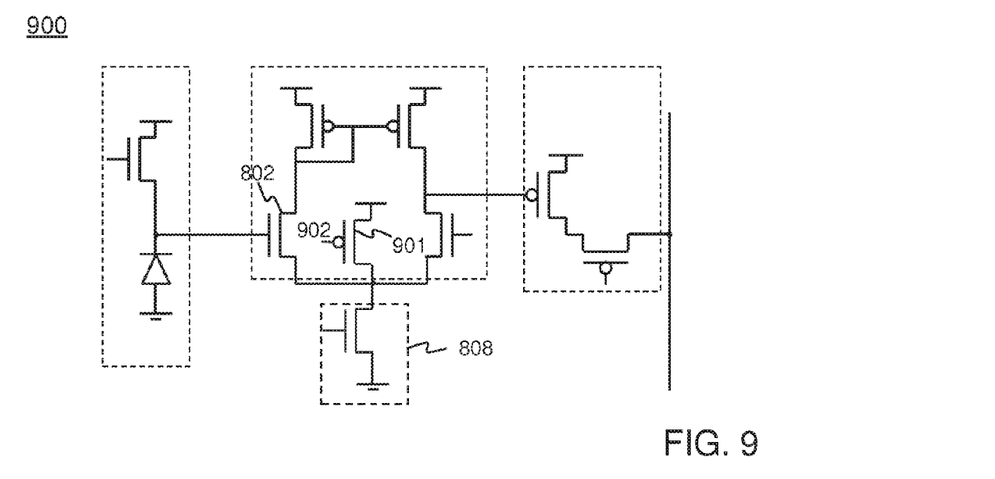
FIG. 9 illustrates a first variant of the alternative pixel sensor, which is schematically represented in a circuit diagram.
Figure 10:
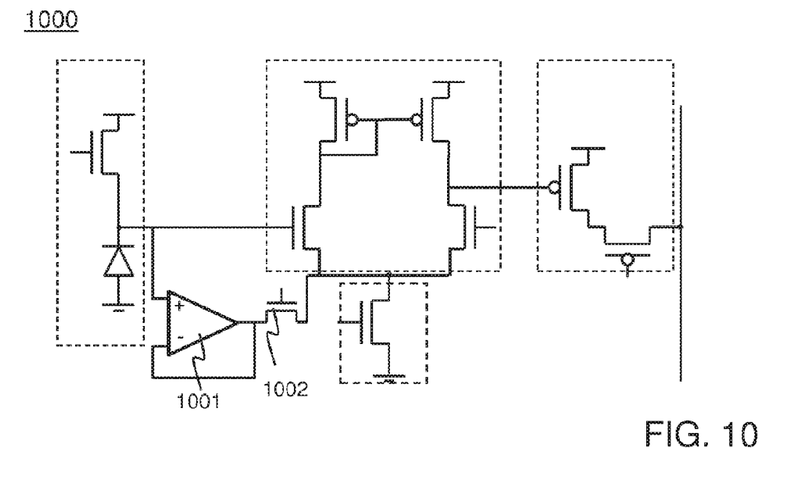
FIG. 10 illustrates a second variant of the alternative pixel sensor, which is schematically represented in a circuit diagram.
Figure 11:
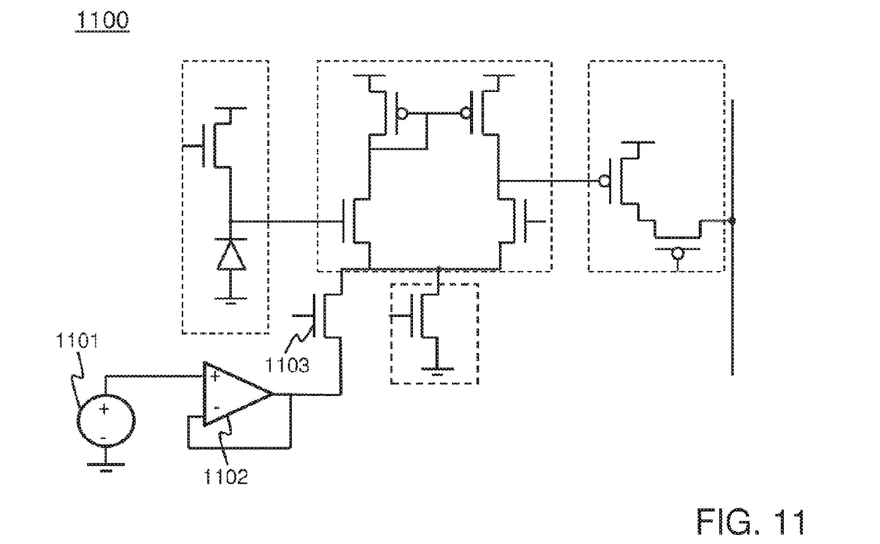
FIG. 11 illustrates a third variant of the alternative pixel sensor, which is schematically represented in a circuit diagram.

FIGS. 9 to 11 illustrate various variants of the alternative pixel sensor 800. These variants comprise an additional arrangement for applying a disabling biasing voltage to the source of the input transistor 802 during the photo detection time interval 410. Like elements are denoted by like reference numerals. For the sake of simplicity and convenience, only those elements that are discussed are denoted by reference numerals.

FIG. 9 illustrates a first variant 900 in which the additional arrangement comprises a binary driver circuit 901. The binary driver circuit 901 is in the form of a PMOS transistor, whereas the controllable current source 808 is in the form of an NMOS transistor. The drain of the PMOS transistor is coupled to the source of the input transistor 802, as well as to the controllable current source 808. The PMOS transistor can be put in an active, saturated state during the photo detection time interval 410. A voltage close to the positive power supply voltage is then imposed on the source of the input transistor 802 during this time interval. To that end, a gating signal 902 similar to the gating signal 403 illustrated in FIG. 4 may be applied to the gate of the PMOS transistor.

FIG. 10 illustrates a second variant 1000 in which the additional arrangement comprises a voltage follower circuit 1001 and a biasing switch circuit 1002. This arrangement operates in a fashion similar to that described with reference to FIG. 6.

FIG. 11 illustrates a third variant 1100 in which the additional arrangement comprises a voltage source 1101, a voltage follower circuit 1102 and a biasing switch circuit 1103. This arrangement operates in a fashion similar to that described with reference to FIG. 7.

Figure 12:
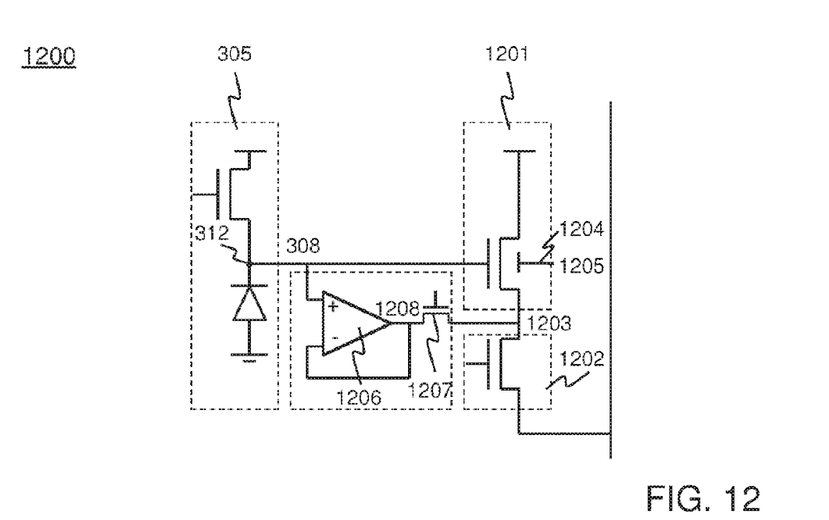
FIG. 12 illustrates an analog pixel sensor, which is schematically represented in a circuit diagram.

FIG. 12 illustrates a pixel sensor 1200 of a different type to which a gate leakage current reduction technique is applied similar to that described hereinbefore. The pixel sensor 1200 illustrated in FIG. 12 is an analog type pixel sensor that provides an analog readout signal. The pixel sensor 300 illustrated in FIG. 12 will be referred to as analog pixel sensor 1200 hereinafter for reasons of convenience. The analog pixel sensor 1200 illustrated in FIG. 12 can be used in an image sensor that is somewhat different from the image sensor 102 illustrated in FIG. 2 and described hereinbefore. For example, several analog pixel sensors, which may be on a same row, or on a same column, can be coupled to an analog to digital conversion module that converts an analog readout signal from such a pixel sensor into a digital value.

The analog pixel sensor 1200 comprises a photo detector circuit 305, a front-end circuit 1201, and an output switch circuit 1202, which is a basic architecture similar to that of the pixel sensor 300 illustrated in FIG. 3. The photo detector circuit 305 may be similar to that of the pixel sensor 300 illustrated in FIG. 3 and has therefore been assigned a same reference numeral. The photo detector circuit 305 thus provides a photo detection voltage 308 on a photo detection node 312. For the sake of simplicity and convenience, only those elements that are discussed are denoted by reference numerals.

The front-end circuit 1201 of the analog pixel sensor 1200 is notably different. The front-end circuit 1201 is an analog buffer that comprises a CMOS transistor in a so-called source follower configuration. The analog buffer provides an output voltage 1203 that is a buffered copy of the photo detection voltage 308. The output voltage 1203 corresponds with the photo detection voltage 308 on which a gate-source voltage differential is superposed. This gate source-voltage differential depends on a threshold voltage of the CMOS transistor. The CMOS transistor comprises a biasing node 1204 though which a biasing voltage 1205 is applied to a well in which the CMOS transistor is formed.

The analog pixel sensor 1200 comprises a switchable biasing arrangement that puts the CMOS transistor in a disabled state during a photo detection time interval 410. The switchable biasing arrangement comprises a voltage follower circuit 1206 and a biasing switch circuit 1207. This switchable biasing arrangement operates in a fashion similar to that described hereinbefore with reference to FIG. 6. Briefly stated, the switchable biasing arrangement applies a buffered copy 1208 of the photo detection voltage 308 to the source of the CMOS transistor during the photo detection time interval 410. The buffered copy 1208 constitutes a disabling biasing voltage, which prevents the CMOS transistor from producing a significant gate leakage current.

Figure 13:
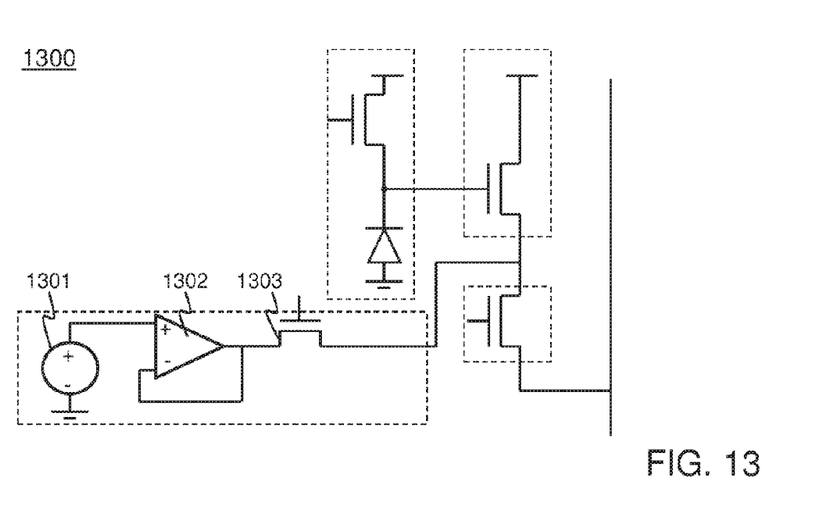
FIG. 13 illustrates a variant of the analog pixel sensor, which is schematically represented in a circuit diagram.

FIG. 13 illustrates a variant 1300 of the analog pixel sensor. This variant 1300 comprises a switchable biasing arrangement different from that of the analog pixel sensor 1200 illustrated in FIG. 12. The switchable biasing arrangement of the variant comprises a voltage source 1301, a voltage follower circuit 1302, and a biasing switch circuit 1303. This switchable biasing arrangement operates in a fashion similar to that described hereinbefore with reference to FIG. 6.

Turning again to the pixel sensor 300 illustrated in FIG. 3, process variations, which are inherent to semiconductor manufacturing, may potentially impair a proper functioning of this pixel sensor 300. In particular, there may be significant variations in transistor threshold voltages from, for example, one batch to another, from one silicon wafer to another, and even from one silicon die to another. As a result, there may be significant variations in the comparator threshold level of the front-end circuit 306 described hereinbefore with reference to FIG. 3.

The comparator threshold value of a specimen of the pixel sensor 300 illustrated in FIG. 3 may deviate from a desired nominal value to a relatively large extent. This deviation may cause a reduction in dynamic range, which can be significant. In a worst-case situation, this deviation may be so large that the aforementioned gate-source voltage level difference between the input transistor 314 and the complementary transistor 315 remains below the comparator threshold level throughout the readout time interval 414, even under relatively strong light conditions. In such a worst-case situation, the pixel sensor 300 will function poorly and may even turn out to be useless. This equally applies to the variants illustrated in FIGS. 4 to 6.

Figure 14:
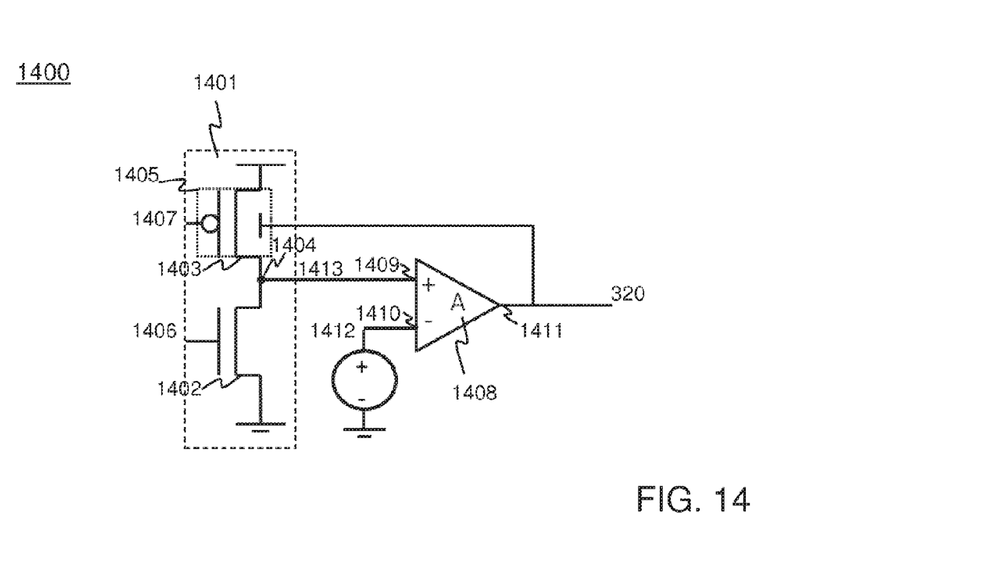
FIG. 14 illustrates a biasing circuit, which is schematically represented in a circuit diagram.

FIG. 14 illustrates an embodiment 1400 of the biasing circuit mentioned hereinbefore, which can alleviate problems due to process variations as described hereinbefore. This embodiment is schematically represented in a circuit diagram and will be referred to as the biasing circuit 1400 hereinafter for reasons of convenience. The biasing circuit 1400 generates the well biasing voltage 320, which is applied to the well 318 of the complementary transistor 315 through the biasing line 319 as illustrated in FIG. 3. This well biasing voltage 320 can also be applied to respective wells of other complementary transistors of other pixel sensors in the image sensor 102 illustrated in FIG. 2. That is, the entire matrix of pixel sensors 201 may receive the well biasing voltage 320.

The biasing circuit 1400 comprises a replica 1401 of the front-end circuit 306 illustrated in FIG. 3. The biasing circuit 1400 thus comprises a replica input transistor 1402 and a replica complementary transistor 1403, each having a gate, a source and a drain. Similarly, the respective drains are coupled to each other and constitute an output node 1404 of the replica 1401 of the front-end circuit. The replica complementary transistor 1403 is also formed in a well 1405. This well 1405 receives the same well biasing voltage 320 as the well 318 of the complementary transistor 315 in the front-end circuit 306 illustrated in FIG. 3.

The gate of the replica input transistor 1402 receives an input voltage 1406 that represents the photo detection voltage 308 under a given light condition. More specifically, the input voltage 1406 may correspond with a level that the photo detection voltage 308 will typically have at the readout start 415 under this given light condition. This given light condition may be, for example, total dark. In that case, there is no discharge and the photo detection voltage 308 will typically remain at the reset biasing voltage. The input voltage 1406 that the gate of the replica input transistor 1402 receives can then correspond with the reset biasing voltage.

The gate of the replica complementary transistor 1403 receives an input voltage 1407 corresponding with a particular level of the ramp 420 in the reference signal 402 illustrated in FIG. 4. At this particular level, the output signal 309 of the front-end circuit 306 illustrated in FIG. 3 should exhibit the transition from 1 to 0 under the given light condition mentioned hereinbefore. For example, in case the given light condition is total dark, the transition from 1 to 0 should occur at the readout start 415 when the ramp 420 is at the low level 421. Consequently, in that case, the input voltage 1407 that the gate of the replica complementary transistor 1403 receives can then correspond with the low level 421 of the ramp 420 illustrated in FIG. 4.

The biasing circuit 1400 further comprises an amplifier 1408 that has a pair of differential inputs 1409, 1410 and an output 1411. The pair of differential inputs comprises a non-inverting input 1409 that is coupled to the output node 1404 of the replica 1401 of the front-end circuit. An inverting input 1410 receives a set point voltage 1412. The set point voltage 1412 may be half way between the positive supply voltage and signal ground, that is, the set point level may be half the positive power supply voltage. The output 1409 of the amplifier 1408 is coupled to the well 1405 of the replica complementary transistor 1403 in the replica 1401 of the front-end circuit. The amplifier 1408 may be in the form of, for example, a differential transistor pair that is coupled to a current mirror.

In the biasing circuit 1400, the replica 1401 of the front-end circuit and the amplifier 1408 form a control loop that operates as follow. The amplifier 1408 compares an output voltage 1403 at the output node 1404 of the replica 1401 of the front-end circuit with the set point voltage 1412. In case the output voltage 1403 is higher than the set point voltage 1412, the amplifier 1408 increases the well biasing voltage 320 that the replica complementary transistor 1405 receives. This causes the output voltage 1413 to decrease, which is a change toward the set point voltage 1412. Conversely, in case the output voltage 1413 is lower than the set point voltage 1412, the amplifier 1408 decreases the well biasing voltage 320. This causes the output voltage 1413 to increase, which is also a change toward the set point voltage 1412.

In a steady-state condition, the output voltage 1413 of the replica 1401 of the front-end circuit will be equal to the set point voltage 1412, apart from an offset voltage that may exist between the pair of differential inputs 1409, 1410 of the amplifier 1408. The steady-state condition corresponds with a center point in the transition from 1 to 0 that occurs in the readout time interval 414. The control loop controls the well biasing voltage 320 so that this transition occurs at the particular level of the ramp 420 in the reference signal 402 under the given light condition.

In effect, the biasing circuit 1400 calibrates the replica 1401 of the front-end circuit by means of the well biasing voltage 320. This calibration counters variations in the comparator threshold value, which could otherwise be significant as a result of production spread as explained hereinbefore.

The aforementioned calibration is, in effect, transposed to the front-end circuit 306 of the pixel sensor 300 illustrated in FIG. 3, as well as to other front-end circuits of other pixel sensors in the image sensor 102 illustrated in FIG. 2. This transposition is achieved by applying the well biasing voltage 320 that the biasing circuit 1400 generates to these front-end circuits. The transposition has an effectiveness that depends on a matching of transistor threshold voltages in the replica 1401 with those in the pixel sensor 300 to which the well biasing voltage 320 is applied. The lesser such a mismatch is, the greater the effectiveness of the transposition.

In order to improve the aforementioned matching of transistor threshold voltages, and thus to improve calibration effectiveness throughout the image sensor 102, the biasing circuit 1400 may comprise a parallel arrangement of several replicas of the front-end circuit 306. This parallel arrangement provides an averaging effect that reduces the mismatch. Referring to FIG. 13, the replica 1401 of the front-end circuit may thus be replaced by several replicas of the front-end circuit 306 arranged in parallel.

A calibration similar to that described hereinbefore may also be applied to the analog pixel sensor 1200 illustrated in FIG. 12, as well as to the variant 1300 illustrated in FIG. 13. As mentioned hereinbefore, the analog pixel sensor 1200 provides a buffered copy 1208 of the photo detection voltage 308, on which the gate-source voltage differential of the CMOS transistor is superposed. This gate source-voltage differential depends on a threshold voltage of the CMOS transistor. Problems due to process variations as described hereinbefore may thus also occur in image sensors comprising analog pixel sensors, such as the one illustrated in FIG. 12.

A biasing circuit for the analog pixel sensor 1200 illustrated in FIG. 12 may comprise a replica of the analog buffer to which an input voltage is applied that is a substitute of the photo detection voltage 308. This input voltage has a defined level, which may correspond with a level that the photo detection voltage 308 may have for a given amount of light. The biasing circuit may further comprise a control loop that controls a biasing voltage that is applied to the well of the CMOS transistor in the replica. The control loop controls this well biasing voltage so that the replica of the analog buffer provides a defined output voltage.

Notes

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to image acquisition. The term "pixel sensor" should be understood in a broad sense. The term may embrace any arrangement capable of providing an electrical output signal indicative of a physical phenomenon, which may be, for example, light, heat, a phenomenon of a chemical nature, a biological nature. In fact, any type of transducer may constitute a pixel sensor within the meaning of this application. Referring to the embodiments described hereinbefore, the photo diode may be replaced by another type of transducer, such as, for example, a so-called ChemFET, ISFET, and so on. The term "front-end circuit" should also be understood in a broad sense. The term may embrace any circuit capable of providing an output signal indicative of the physical phenomenon concerned in response to a detection quantity that the pixel sensor provides.

There are numerous different circuit technologies to which the invention can be applied. The invention describes, by way of example, certain embodiments that concern CMOS technology. As another example, the invention can be applied to silicon on insulator (SOI) technologies. In a partially-depleted SOI technology, a biasing voltage that counters threshold variations can be applied to a thick doped channel below the gate of a transistor. In a fully-depleted SOI technology, such a biasing voltage can be applied to a lightly doped well, which is separated from a non-doped channel, below the gate, by a thin buried oxide layer. In these examples, as well as in the embodiments presented hereinbefore, the biasing voltage is applied to a semiconductor region that affects the threshold voltage of the transistor.

There are numerous different ways of implementing a front-end circuit in accordance with the invention. For example, a front-end circuit may have a PMOS transistor as an input transistor, and an NMOS transistor as a complementary transistor. Such an NMOS/PMOS inversion can be applied to other embodiments presented hereinbefore. Control signals may be adapted accordingly. For example, a reference signal that is applied to a comparator for converting an analog value into a binary pulse may comprise a negative ramp, which decreases in level over time.

There are numerous different ways of generating and applying a biasing voltage that counters threshold variations in accordance with the invention. For example, in a further variant of the pixel sensor 300 illustrated in FIG. 3, the input transistor 314 may be formed in a P-well using, for example, triple-well technology. In that case, a biasing voltage may be applied to this well instead of the N-well of the complementary transistor 315. It is also possible to counter threshold variations by means of two biasing voltages, one of which is applied to the N-well of the complementary transistor 315, the other biasing voltage being applied to the P-well of the input transistor 314.

There are numerous different ways of implementing a biasing circuit in accordance with the invention. For example, referring to FIG. 14, the amplifier 1408 may be replaced by a comparator circuit, a digital control circuit, and a digital-to-analog converter. The digital control circuit may receive a comparison result from the comparator circuit, on the basis of which the digital control circuit controls the digital-to-analog converter, which provides the biasing voltage. The digital control circuit adjusts the biasing voltage by controlling the digital-to-analog converter so as to achieve a steady-state condition in which the output voltage of the replica is sufficiently close to the set point voltage.

It should be noted that a calibrating biasing scheme has been described that can be used in devices other than image sensors. In fact, the calibrating biasing scheme can in principle be applied to any type of circuit that provides an input-output relationship, which is affected by a threshold voltage of a transistor within the circuit. Broadly defined, the biasing scheme consists in providing a replica of the circuit concerned and a calibrating control loop. The calibrating control loop calibrates the input-output relationship of the replica by means of a biasing voltage, which is applied to a semiconductor region that affects the threshold voltage of the transistor concerned. This biasing voltage is then also applied to the circuit, or the circuits, on which the replica is based.

It should be noted that a dynamic calibration scheme can also improve image quality. Referring to FIGS. 3 and 4, the dynamic calibration scheme can operate as follows. After the readout time interval 414 illustrated in FIG. 4, a subsequent reset time interval occurs. The reset biasing voltage is again enforced on the photo detection node 312 by putting the reset transistor 311 in the conducting state. The subsequent reset interval is then followed by a relatively short pseudo photo detection time interval. In this time interval, the reset transistor 311 is in the non conducting state, like in the photo detection time interval 410 illustrated in FIG. 4 described hereinbefore. The photo current, if present, from the photo diode 310 may thus discharge the photo detection node 312. However, any such discharge will be relatively brief because the pseudo photo detection time interval is relatively short. The pseudo photo detection time interval is quickly followed by a subsequent readout time interval.

In the subsequent readout time interval, which follows the relatively short pseudo photo detection time interval, the pixel sensor 300 operates as in the readout time interval 414 described hereinbefore in detail with reference to FIG. 4. The pixel sensor 300 will thus present a binary pulse on the readout line 302. In this case, the binary pulse represents a dark level or, rather, a near-to-dark level in case the photo diode 310 is exposed to light during the pseudo photo detection time interval. The binary pulse may thus be considered as a reference pulse, in contrast with the binary pulse that the pixel sensor 300 provides in the readout time interval 414 following the "real" photo detection time interval 410. The latter pulse constitutes a photo detection pulse that is destined to be converted into a pixel value.

The conversion module 202 illustrated in FIG. 2 can provide a corrected pixel value on the basis of the photo detection pulse and the reference pulse obtained as described hereinbefore. For example, the conversion module 202 may generate a reference value by means of the counter mentioned hereinbefore. A count of the reference pulse provides the reference value, just like the count of the photo detection pulse provides a gross pixel value, as described hereinbefore. The conversion module 202 may then subtract the reference value from the gross pixel value so as to obtain the corrected pixel value.

The dynamic calibration scheme is thus characterized by photo detection cycles and reference definition cycles that are interleaved. These cycles are similar in structure: a reset time interval, followed by a photo detection time interval, followed by a readout time interval as illustrated in FIG. 4. However, the photo detection time interval of a photo detection cycle is relatively long, whereas the photo detection time interval of a reference definition cycle is relatively short. As mentioned hereinbefore, the latter photo detection time interval is a pseudo photo detection time interval, which may cover a single clock cycle only, for example, whereas the real photo detection time interval may cover 100 to 1000 clock cycles. In a reference definition cycle, a pixel sensor provides an output signal, which is a binary pulse in this example, which can serve as a dark level reference. In the photo detection cycle, the pixel sensor provides an output signal that represents an amount of light, which can be detected relatively precisely with reference to the dark level reference.

It should be noted that an image sensor in accordance with the invention need not necessarily comprise a shutter arrangement. That is, a pixel sensor such as the pixel sensor illustrated in FIG. 3 may continuously be exposed to light. Referring to FIGS. 3 and 4 this implies that the photo diode 310 may continue to discharge the photo detection node 312 after the photo detection time interval 410. In case the readout time interval 414 is relatively short compared with the photo detection time interval 410, this continued discharge during the readout time interval 414 affects the photo detection voltage 308 to a relatively small extent only. For example, the readout time interval 414 may cover a single clock cycle only, whereas the photo detection time interval 410 may cover 100 to 1000 clock cycles. The photo detection time interval 410 can be adapted in this duration range depending on an amount of light to which the pixel sensor 300 illustrated in FIG. 3 is exposed. The ramp 420 will be relatively steep if the readout interval 414 is relatively short, which is different from what is very schematically illustrated in FIG. 4. An embodiment without a shutter arrangement can be advantageous in terms of, for example, low cost and low power consumption. Namely, an element that has a certain cost and power consumption is dispensed with.

In general, there are numerous different ways of implementing the invention, whereby different implementations may have different topologies. In any given topology, a single module may carry out several functions, or several modules may jointly carry out a single function. In this respect, the drawings are very diagrammatic.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. An image sensor, comprising:
a photo detector circuit arranged to apply a photo current to a capacitive node during a photo detection time interval, whereby a reset voltage is forced upon the capacitive node before the photo detection time interval starts;
a front-end circuit comprising an input transistor having a gate that is coupled to the capacitive node, the input transistor further comprising a source and a drain; and
a switchable biasing arrangement putting the input transistor in a disabled state during the photo detection time interval whereby, when the photo detection time interval starts, one of the following biasing operations are carried out: a first biasing operation in which a voltage that approximates the reset voltage is applied to the drain of the input transistor and a voltage that approximates the reset voltage is applied to the source of the input transistor; a second biasing operation in which a voltage that approximates the reset voltage is applied to the drain of the input transistor and the source of input transistor is made floating so that the source is at a voltage that approximates the reset voltage, and a third biasing operation in which a voltage that approximates the reset voltage is applied to the source of the input transistor and the drain of input transistor is made floating so that the drain is at a voltage that approximates the reset voltage, and putting the input transistor in an enabled state after the photo detection time interval, causing the front-end circuit to provide an output signal that is representative of a voltage on the capacitive node after the photo detection time interval.

2. An image sensor according to claim 1, wherein the switchable biasing arrangement applies a disabling biasing voltage to the source of the input transistor during the photo detection time interval, the disabling biasing voltage approximating the reset voltage, which puts the input transistor in the disabled state, and applies an enabling biasing voltage to the source after the photo detection time interval, which puts the input transistor in the enabled state.

3. An image sensor according to claim 2, wherein the switchable biasing arrangement comprises a binary driver circuit providing a gating signal that can be switched between two levels, one of which corresponds with the disabling biasing voltage, the other level corresponding with enabling biasing voltage.

4. An image sensor according to claim 3, wherein the switchable biasing arrangement comprises a voltage follower circuit providing a buffered copy of the voltage on the capacitive node, the buffered copy corresponding with the disabling biasing voltage.

5. An image sensor according to claim 2, wherein the switchable biasing arrangement comprises a voltage source circuit providing the disabling biasing voltage.

6. An image sensor according to claim 1, wherein the switchable biasing arrangement comprises a biasing switch circuit coupled between the source of the input transistor and a supply voltage line, the switchable biasing arrangement putting the biasing switch circuit in a non conducting state during the photo detection time interval, which causes the source to be at a voltage that approximates the reset voltage, and to put the switch circuit in a conducting state after the photo detection time interval.

7. An image sensor according to claim 1, wherein:
the input transistor forms part of a differential transistor circuit; and
the switchable biasing arrangement comprises a controllable current source that is coupled to the differential transistor circuit, the switchable biasing arrangement disabling the controllable current source during the photo detection time interval and enabling the controllable current source after the photo detection time interval.

8. An image sensor according to claim 7, wherein the switchable biasing arrangement applies a disabling biasing voltage to the source of the input transistor during the photo detection time interval, the disabling biasing voltage approximating the reset voltage.

9. An image sensor according to claim 8, wherein the switchable biasing arrangement comprises one of the following circuits providing the disabling biasing voltage: a binary driver circuit, a voltage follower circuit providing a buffered copy of the voltage on the capacitive node, and a voltage source circuit.

10. An image sensor according to claim 1, wherein the input transistor is of the field effect type.

11. An image acquisition device comprising an image sensor according to claim 1.

* * * * *